United States Patent [19]

Matsuo et al.

[11] Patent Number: 4,629,043
[45] Date of Patent: Dec. 16, 1986

[54] ELECTRIC PARKING BRAKE SYSTEM FOR A VEHICLE

[75] Inventors: Masayoshi Matsuo; Kazuhiro Takagishi; Kouji Tobita; Yukihiro Kanemaru, all of Hiroshima, Japan

[73] Assignee: Mazda Motor Corporation, Hiroshima, Japan

[21] Appl. No.: 575,663

[22] Filed: Jan. 31, 1984

[30] Foreign Application Priority Data

| Jan. 31, 1983 | [JP] | Japan | 58-14755 |
| Feb. 5, 1983 | [JP] | Japan | 58-17776 |
| Feb. 5, 1983 | [JP] | Japan | 58-17777 |
| Feb. 5, 1983 | [JP] | Japan | 58-17778 |
| Feb. 9, 1983 | [JP] | Japan | 58-20363 |

[51] Int. Cl.$^4$ ............................. B60K 41/28
[52] U.S. Cl. .................. 192/4 A; 192/3 TR; 192/9
[58] Field of Search .......... 192/3 H, 3 TR, 3 S, 192/4 A, 4 C, 9, 1, 2; 180/271, 282

[56] References Cited

U.S. PATENT DOCUMENTS

| 3,752,251 | 8/1973 | Gaeke | 180/282 X |
| 3,830,330 | 8/1974 | Fontaine | 192/3 TR X |
| 4,446,950 | 5/1984 | Wise et al. | 192/9 X |

FOREIGN PATENT DOCUMENTS

| 48-21329 | 3/1973 | Japan . | |
| 54-105429 | 11/1979 | Japan . | |
| 55-140634 | 8/1980 | Japan . | |
| 57-198161 | 12/1981 | Japan | 180/282 |

*Primary Examiner*—George H. Krizmanich
*Attorney, Agent, or Firm*—Gerald J. Ferguson, Jr.; James E. Bryan; Michael P. Hoffman

[57] ABSTRACT

An improved electric parking brake system for a vehicle capable of controlling the brake-applying and releasing operations of a parking brake in an optimal manner in accordance with the gradient of the road on which the vehicle is stopped. The inventive parking brake system comprises in combination: a parking brake; an electromagnetic element in the form of a motor for controlling application and release of the parking brake; a command-signal producing device operable to alternatively feed a brake-application command signal or a brake-release command signal to the electromagnetic element; a gradient sensor adapted to detect the gradient of the road on which the vehicle rests for sending out a signal indicative of the gradient detected; and a controller adapted to receive the signals from the command-signal producing device and the gradient sensor for controlling the brake-applying operation and/or the brake-releasing operation of the electromagnetic element in a manner such that the parking brake can be operated optimally in accordance with the gradient of the road.

18 Claims, 16 Drawing Figures

ELECTRIC PARKING BRAKE SYSTEM FOR A VEHICLE

BACKGROUND OF THE INVENTION

1. Field of the Invention

This invention relates to automotive brake systems, and more specifically, to an improvement in automotive parking brake systems.

2. Description of the Prior Art

It is generally desirable that a parking brake be actuated when an automotive vehicle is stopped in order to minimize the damage from a possible rear-end collision, and application of the parking brake is required particularly upon stopping on a slope so that the vehicle will be prevented from rolling down the slope even when the main or foot brake is released. However, the conventional type of parking brake actuated by manual operation is very troublesome to operate every time the vehicle is stopped and started and is liable to cause the operator increased fatigue. In addition, with such a conventional parking brake, it has been frequently experienced that brake drag and/or engine stall are caused when the vehicle is inadvertently started without releasing the brake.

In order to cope with the above-described problems, various proposals have hitherto been made for automating the operation of the parking brake. For example, Japanese Unexamined Utility Model Publication No. 48(1973)-21329 relates to an invention entitled "Device for Controlling a Side Brake in an Automobile" which is characterized by an actuator means adapted to be operated by an actuation signal, which is developed upon depression of the foot-brake pedal during stopping of the vehicle, to actuate a side or parking brake, and a brake release means adapted to be operated by a release signal, which is issued upon depression of the accelerator pedal under application of the side brake, to release the latter. Also, disclosed in Japanese Unexamined Utility Model Publication No. 54(1979)-105429 is an invention named "Side Brake Control Device" in which current is supplied to a motor for actuating a side brake in response to the respective actuations of a foot-brake switch responsive to the depression of the foot brake, and a pushbutton switch adapted to be operated upon actuation of the side brake, the supply of current to the motor being stopped in response to the depression of the accelerator pedal or the clutch pedal. Further, according to Japanese Unexamined Patent Publication No. 55(1980)-140634, there is shown a "System for Automatically Releasing a Parking Brake in an Automobile" which comprises a parking-brake detecting means for detecting the application of a parking brake, an accelerator-pedal detecting means for detecting the depression of the accelerator pedal, a shift-position detecting means for detecting the shift position of the transmission, and a brake-releasing means operable to release the parking brake in response to signals from the above-mentioned respective means.

In accordance with the teachings of the above prior art, the aforementioned problems encountered in the manually-operated parking brake can be overcome, but on the other hand, there is another problem as described below. Namely, application and release of a parking brake must intrinsically be effected in an appropriate manner depending on whether the road on which the vehicle is stopped is flat or sloped, or depending on the gradient of the road, but none of the prior art devices as referred to above is able to control the operation of the parking brake in accordance with the gradient of the road. As a result, there arises, for example, a problem that an automobile, when stopped on a steep slope, may start to move down the slope owing to an insufficient brake force of the parking brake, or the automobile may roll back down the slope due to premature release of the parking brake upon starting on an uphill grade.

SUMMARY OF THE INVENTION

In view of the above, the present invention is intended to obviate the above-described various problems encountered in the prior art.

A general and broad object of the present invention is to control the brake-applying and releasing operations of a parking brake of a vehicle in an optimal manner in accordance with the gradient of the road on which the vehicle is parked.

A specific object of the present invention is to properly control the brake-releasing speed of a parking brake during starting of a vehicle in accordance with the gradient of the road.

Another specific object of the present invention is to properly control the starting time of the brake-releasing operation of a parking brake in accordance with the gradient of the road.

A more specific and corollary object of the present invention is to provide an excellent and smooth startability for a vehicle at any time by initiating the brake-releasing operation of a parking brake at the instant when the engine output power rises to a value suitable to the road gradient during starting of the vehicle on an uphill grade.

A further object of the present invention is to controllably vary the braking force of a parking brake in accordance with the degree of inclination of a vehicle so that an appropriate braking force of the parking brake is obtained at all times, thus ensuring the safety of the vehicle in its stopped condition.

To achieve the general and broad object of the present invention as referred to above, the invention resides in an electric parking brake system for vehicles which comprises in combination:

a parking brake installed on a vehicle;

an electromagnetic means for controlling application and release of the parking brake;

a command-signal producing means operable to alternatively feed a brake-application command signal and a brake-release command signal to the electromagnetic means;

A gradient sensor adapted to detect the gradient of the road on which the vehicle rests for sending out a signal indicative of the gradient detected; and a controller adapted to receive the signals from the command-signal producing means and the gradient sensor for controlling at least one of the brake-applying operation and the brake-releasing operation of the electromagnetic means in a manner such that the parking brake can be operated optimally in accordance with the gradient of the road.

The above and other objects, features and advantages of the present invention will become apparent from the following detailed description of a few preferred embodiments of the invention when taken in conjunction with the accompanying drawings.

DESCRIPTION OF THE PREFERRED EMBODIMENTS

In the following description of a few preferred embodiments of the present invention, same or like parts or elements are identified with same or like references throughout the embodiments.

Figure 1:
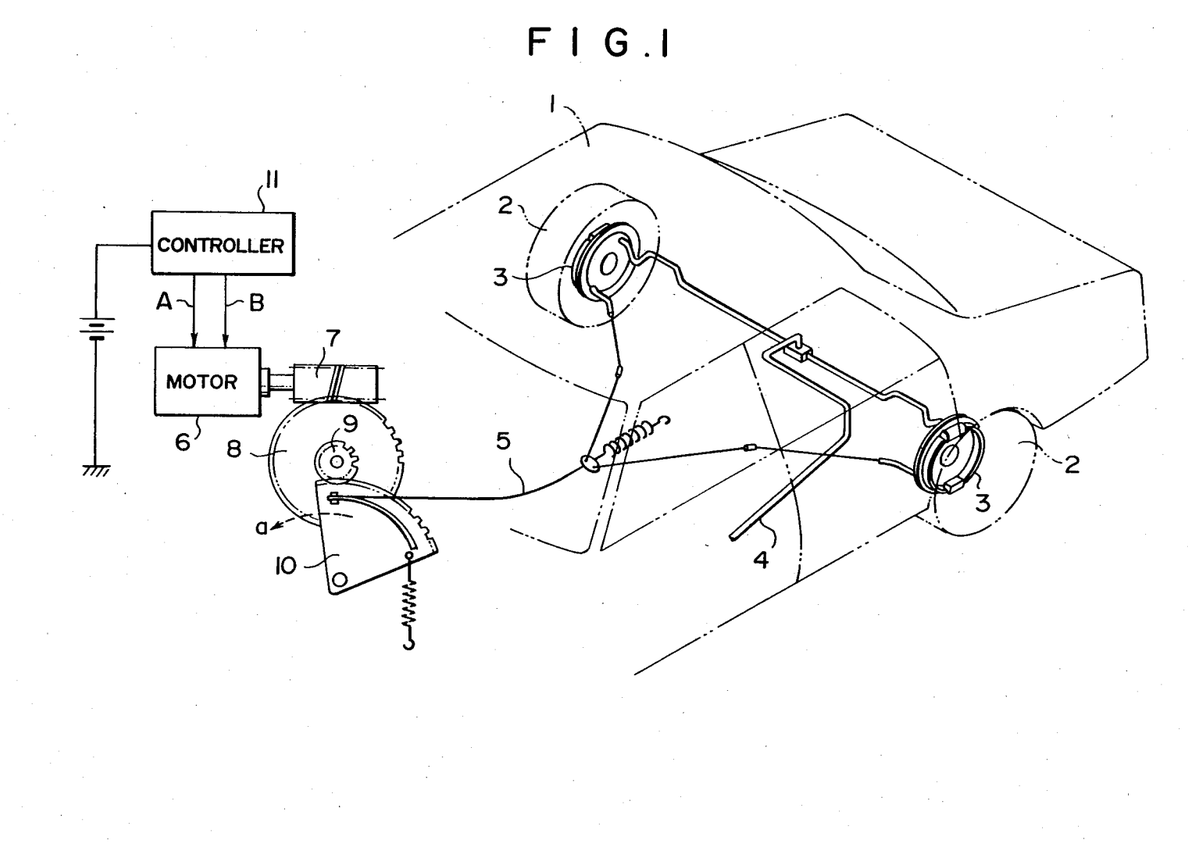
FIG. 1 is a schematic illustration of a brake system for a vehicle incorporating an electric parking brake system constructed in accordance with the present invention.

Referring to the drawings and first to FIG. 1, there is schematically illustrated an automotive vehicle 1 which has a pair of rear wheels 2, 2 respectively provided with wheel brakes 3, 3. Connected to these wheel brakes 3, 3 are a main brake pipe 4 for feeding brake fluid under pressure to the wheel brakes 3, 3 upon depression of a brake pedal (not shown), and a parking brake cable 5 which is adapted to actuate the brakes 3, 3 in a mechanical manner. The parking brake cable 5 is connected at its forward end or at its left-hand end in FIG. 1 with a winding member 10, which is rotated by rotation of a motor 6 through a worm 7, a worm wheel 8 and a pinion 9, so that the brakes 3, 3 are actuated through the cable 5 as the winding member 10 is rotated in the direction indicated by arrow a from its illustrated position upon forward or reverse rotation of the motor 6, whereas the brakes 3, 3 thus actuated are released or deactuated when the motor 6 is rotated in the reverse or forward direction. The rotation of the motor 6 is controlled by a brake-application command signal A and a brake-release command signal B from a controller 11 to actuate or de-actuate the brakes 3, 3.

Figure 2:
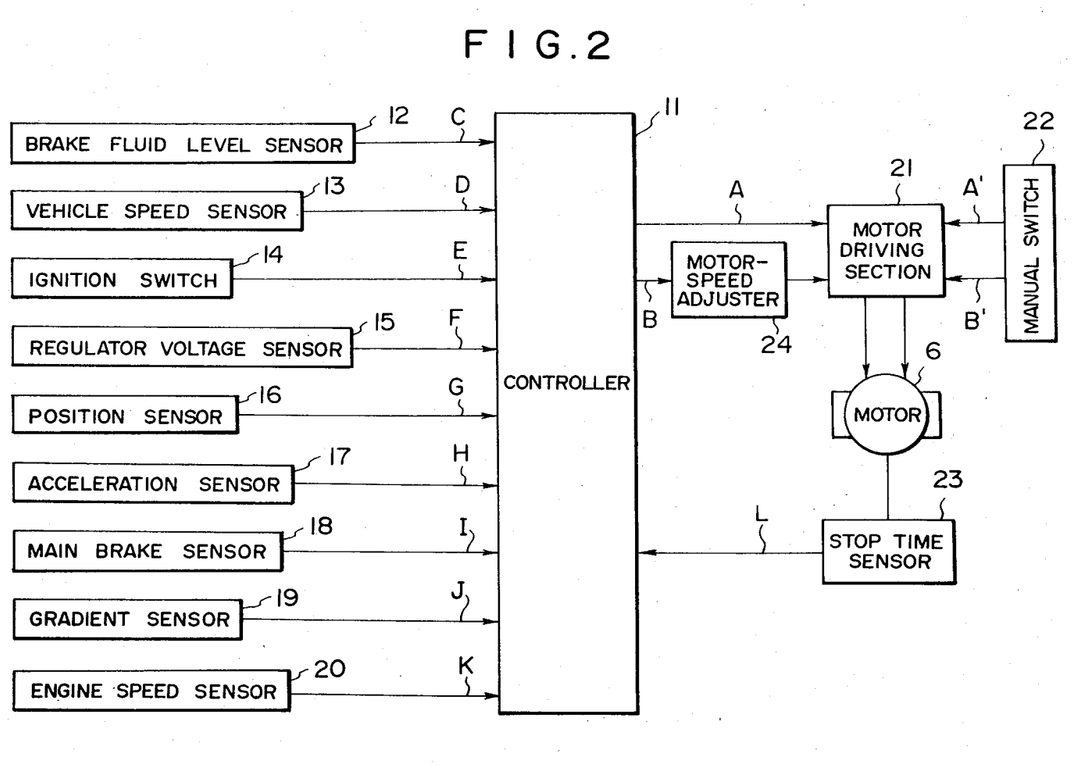
FIG. 2 is a block diagram showing a first embodiment of a control section of the electric parking brake system of FIG. 1.

As shown in FIG. 2, the controller 11 is fed with signals C-K from various sensor means 12-20 which comprise a brake-fluid level sensor 12 for detecting any failure in the main brake system from the level of the brake fluid, an ignition switch 14, a regulator-voltage sensor 15 for detecting from the voltage generated by a regulator whether the engine of the vehicle is in or out of operation, a position sensor 16 for detecting the gear position of a transmission, an acceleration sensor 17 adapted to detect whether an accelerator pedal is depressed or not, a main brake sensor 18 adapted to detect whether a brake pedal is depressed or not, a gradient sensor 19 for detecting the gradient of the road, and an engine-speed sensor 20 for detecting the number of revolutions per minute of an engine. On the basis of the signals C-K, the controller 11 produces and sends out as an output a brake-application command signal A or a brake-release command signal B to the motor 6 through a motor-driving section 21. In this connection, however, the brake-release command signal B is fed from the controller 11 to the motor-driving section 21 by way of a motor-speed adjuster 24. On the other hand, in a case where the control mode for the parking brake is changed from automatic to manual by the controller 11, the motor-driving section 21 is fed with a brake-application command signal A' or a brake-release command signal B' from a manual switch 22 instead from the controller 11. The motor 6 is equipped with a stopping-time sensor 23 which sends out a motor-stop signal L to the controller 11. Further, the controller 11 is designed to have a brake-releasing speed characteristic in which the speed of brake release is set in inverse proportion to the gradient of the road, as seen from FIG. 8. The controller 11 also has an engine speed characteristic in which the number of revolutions per minute of the engine required for releasing the parking brake increases with the increasing gradient of the road. The engine speed required for releasing the parking brake is defined as the number of revolutions per minute (RPM) of the engine required to prevent the backward travel of the vehicle even when the parking brake is released upon starting on an ascending road. By experiment it was found that the desirable values of the engine RPM for certain gradients of the road are as shown in Table I below.

TABLE I

| Gradient (%) | Engine RPM |
| --- | --- |
| 0 | 1050 |
| 10 | 1100 |
| 20 | 1200 |
| 30 | 1400 |

Figures 3, 3B:
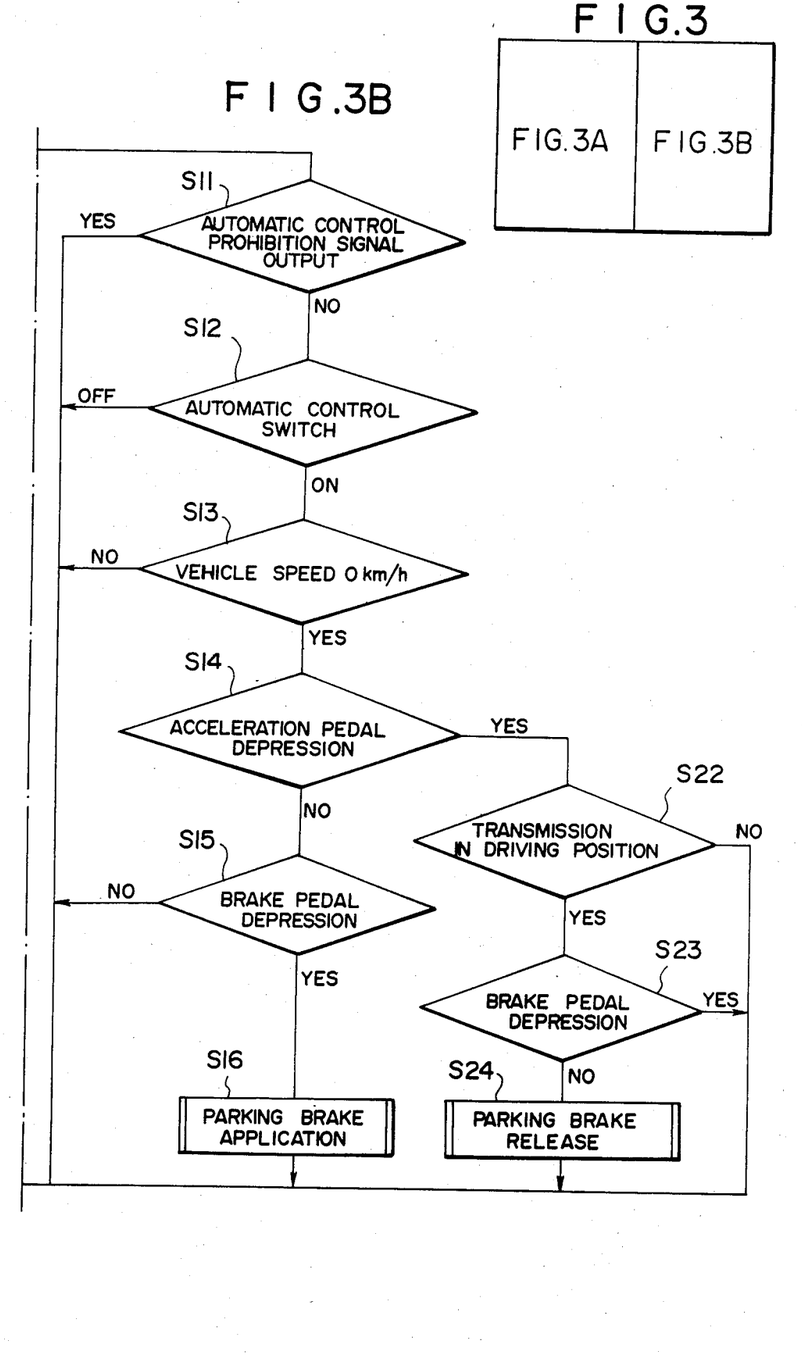
FIGS. 3A and 3B are a flow chart showing the main flow of sequential operations of the electric parking brake system under the action of the control section of FIG. 9.

Now, the operation of the above-described embodiment will be described with reference to a flow chart illustrated in FIGS. 3 to 5.

Figure 3A:
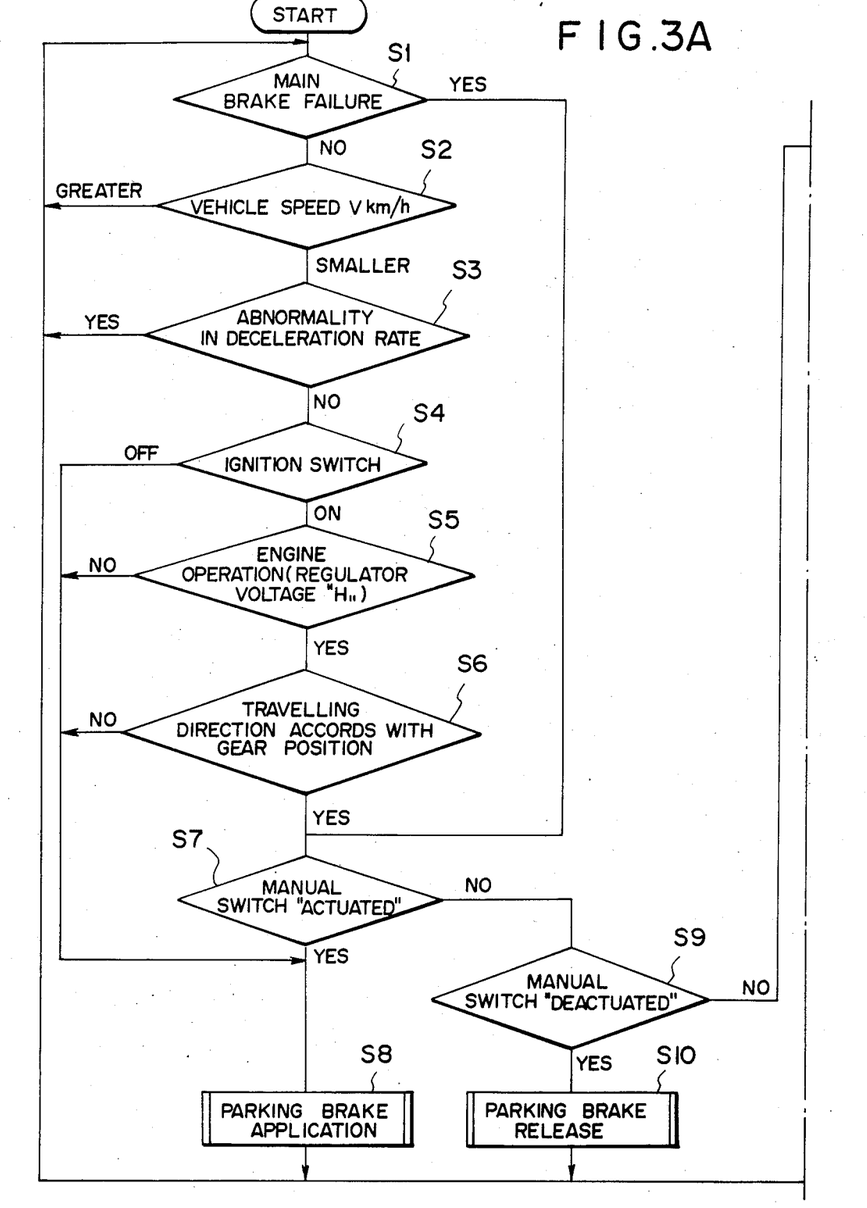
Figure 4:
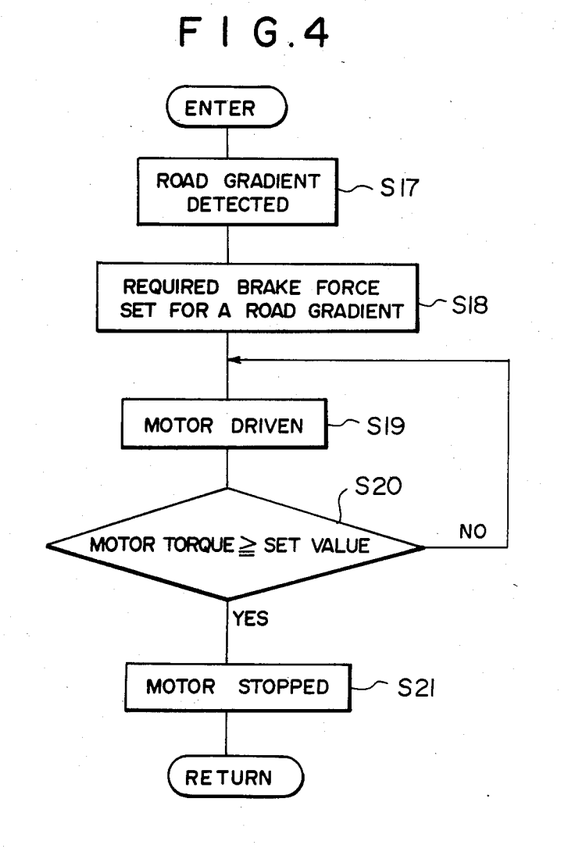
FIGS. 4 and 5 are flow charts respectively showing different sub-flows of sequential operations of the electric parking brake system, these sub-flows being adapted to be connected with the main flow shown in FIG. 3.

First, in accordance with steps S1 to S6 shown in FIG. 3A, the controller 11 confirms the operating condition of the vehicle on the basis of the signals C–G from the brake-fluid level sensor 12, the vehicle-speed sensor 13, the ignition switch 14, the regulator-voltage sensor 15 and the position sensor 16. In this case, assume that it is confirmed that there is no failure in the main brake system and that the requirements for controlling the parking brake system are satisfied, that is to say, the vehicle speed is less than a preset level V; the rate of deceleration is normal; the ignition switch is held "ON"; the engine is in operation; and the direction of travel (the forward or backward travel) of the vehicle is in accord with the selected gear position of the transmission. Then, the parking brake is controlled by the manual switch 22 in accordance with steps S7 to S10. Specifically, when the manual switch 22 is placed into the operative position, it sends out a brake-applying command signal A' to the motor 6 whereas a brake-releasing command signal B' is fed from the manual switch 22 to the motor 6 when the switch 22 is brought into the inoperative or release position. As a consequence, the parking brake is applied or released by the manual switching operation of the switch 22. In this case, if the signal C from the brake-fluid level sensor 12 indicates a failure in the main brake system, it is possible to control the parking brake by means of the manual switch 22 in accordance with steps S1 and S7 to S10 irrespective of whether or not the requirements for controlling the parking brake are satisfied. On the other hand, in case where there is no failure in the main brake system, no control over the parking brake is effected as in steps S2 and S3 when the vehicle speed is greater than the preset level V or when the rate of deceleration is abnormal. But, the parking brake is actuated as in steps S4, S5, S6 and S8 irrespective of the position of the manual switch 2, in cases where the ignition switch is held "OFF", the engine is out of operation, or the direction of travel of the vehicle is not in accord with the gear position as selected of the transmission.

On the other hand, with the manual switch 22 not in the operative position or in the inoperative position, the parking brake is automatically controlled in the following manner in accordance with steps S11 to S16. First, the controller 11 confirms that there is no automatic-control prohibition signal which is issued in the case where automatic control of the parking brake is not desirable on the basis of the traveling condition of the automotive vehicle, and that a switch for switching the control mode of the parking brake is thrown into the position of automatic control mode, and further confirms whether the parking-brake operation requirements are satisfied or not on the basis of the signals D, H and I respectively from the vehicle-speed sensor 13, the acceleration sensor 17 and the main brake sensor 18. Subsequently, if it is confirmed that the above requirements are satisfied (that is, the vehicle speed is zero; the accelerator pedal is not depressed; and the brake pedal is depressed), the controller 11 feeds a brake-application command signal A to the motor 6.

Figure 6:
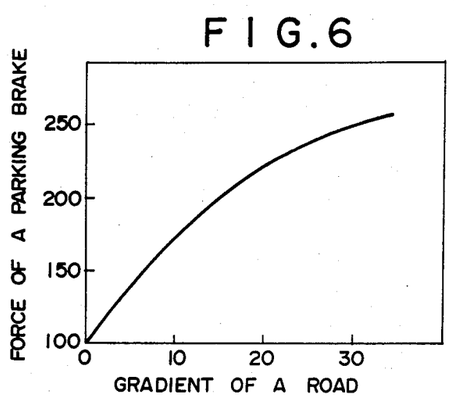
FIG. 6 shows a characteristic set in a controller of FIG. 2, illustrating the relationship between the gradient of the road and the minimum force of the parking brake required for the road gradient.

In this case, the controller 11 operates in accordance with a sub-flow shown in FIG. 4 in the following manner. The controller 11 first detects the gradient of the road by means of a signal J from the gradient sensor 19 as in step S17 and sets the brake force of the parking brake required for the detected road gradient on the basis of a characteristic curve shown in FIG. 6, as in step S18. Thereafter, the motor 6 is driven to rotate by the brake-application command signal A and the driving torque of the motor 6 is compared with the preset value of the brake force so that, when the driving torque of the motor 6 reaches the preset value of the brake force, the motor 6 is stopped by means of a signal L from the motor-stopping time sensor 23 as in steps S19 to S21. As a result, a brake force of the parking brake is obtained which corresponds to the gradient of the road, thus preventing the vehicle from rolling down a steep slope due to an insufficiency of braking force.

Subsequently, when the accelerator pedal is depressed upon starting of the vehicle after the parking brake has been actuated in this manner, a signal H from the acceleration sensor 17, indicative of the depression of the accelerator pedal, is fed to the controller 11 so that the controller 11 can confirm the requirements for releasing the parking brake in accordance with steps S14, S22 and S23, as shown in FIG. 3. In this case, at the instant when these requirements are met (that is, when the signal G from the position sensor 16 indicates the transmission to be in driving position and the signal I from the main brake sensor 18 indicates the brake pedal to be in released position with the accelerator pedal depressed), the controller 11 sends out a brake-releasing command signal B to the motor 6.

Figure 5:
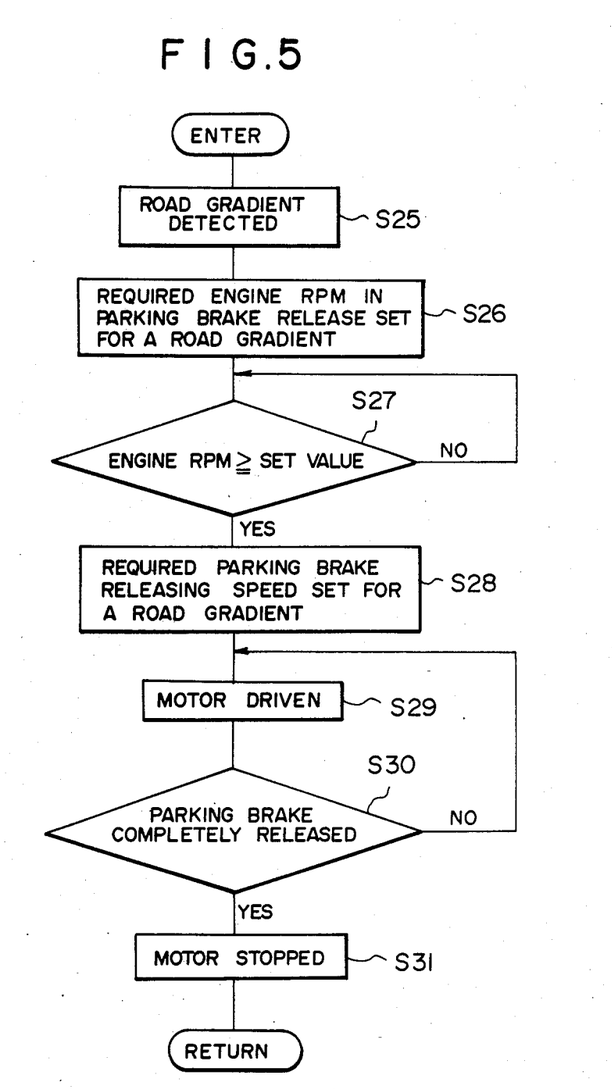
Figure 7:
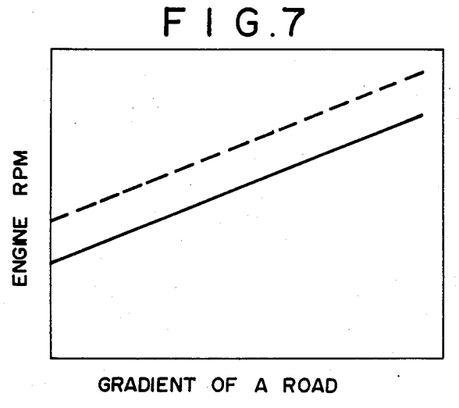
FIG. 7 shows a characteristic set in the controller, illustrating the relationship between the gradient of the road and the minimum force of the parking brake required for the road gradient.
Figure 8:
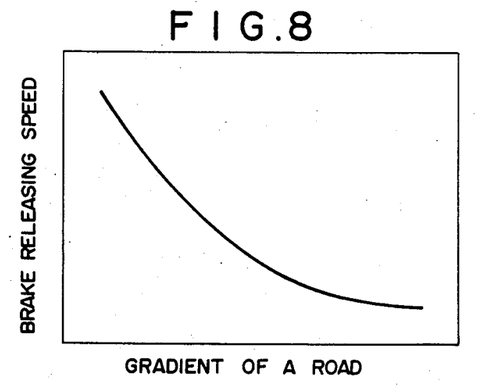
FIG. 8, shows a characteristic set in the controller, illustrating the relationship between the gradient of road and the maximum brake-releasing speed permitted for the road gradient.
Figure 9:
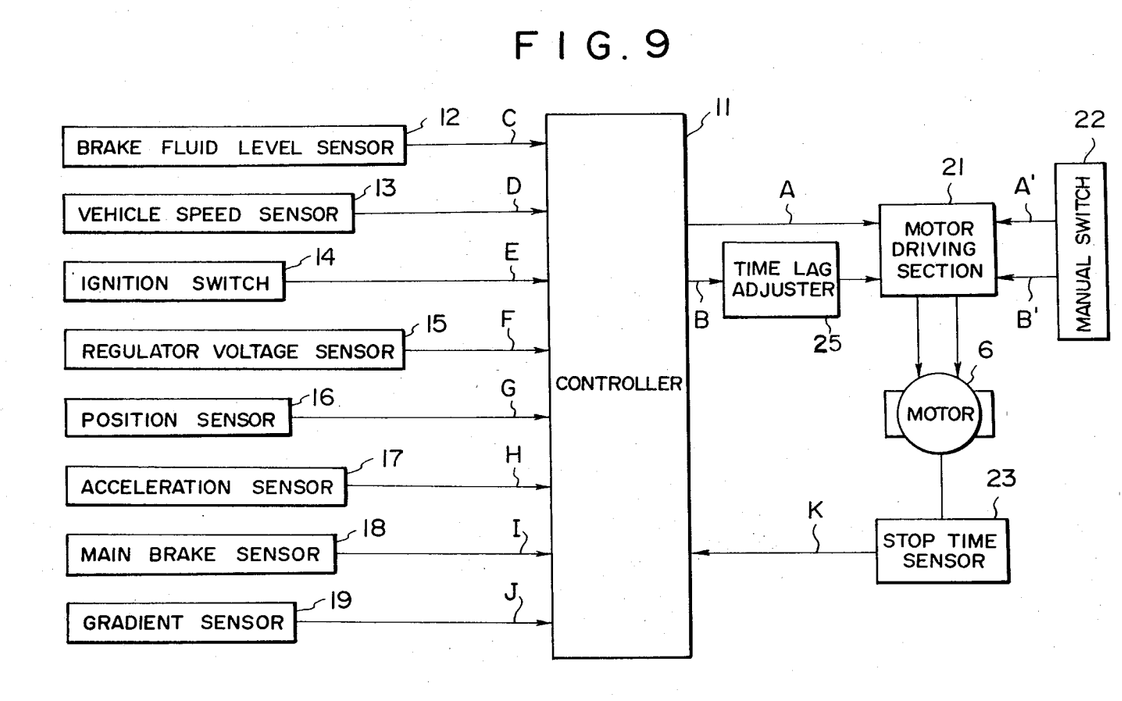
FIG. 9 is a block diagram showing a second embodiment of the control section of the electric parking brake system of FIG. 1.

During releasing operation of the parking brake at this time, the parking brake is controlled in accordance with a sub-flow as shown in FIG. 5. Specifically, the gradient of the road is first ascertained from a signal J from the gradient sensor 19 in step S25, and then the number of revolutions per minute of the engine required before the parking brake can be released on a road with the detected gradient is set in step S26 on the basis of the characteristic line which is shown in FIG. 7 and memorized in the controller 11. Thereafter, by means of a signal K from the engine-speed sensor 20, any increase in engine speed resulting from the depression of the accelerator pedal is detected, and at the instant when the engine speed reaches the above preset value, the releasing speed of the parking brake suitable for the detected gradient of the road is set in accordance with the characteristic curve, as illustrated in FIG. 8, which is memorized in the controller 11, whereby the motor-speed adjuster 24 is so controlled as to make the motor speed assume the preset value, thus driving the motor 6 to rotate in a brake-releasing direction at the speed thus set, as in steps S27, S28 and S29 in FIG. 5. Thereafter, upon complete release of the parking brake, the motor 6 is stopped as in steps S30 and S31. In this manner, the engine speed and the releasing speed of the parking brake at the time when the releasing of the parking brake begins is controlled in an appropriate manner in accordance with the gradient of the road. Thus, for example, when the vehicle is started on a steep uphill grade, there will be no trouble such as backward travel of the vehicle which would otherwise be caused by low engine speed or premature release of the parking brake.

Figures 10, 10B:
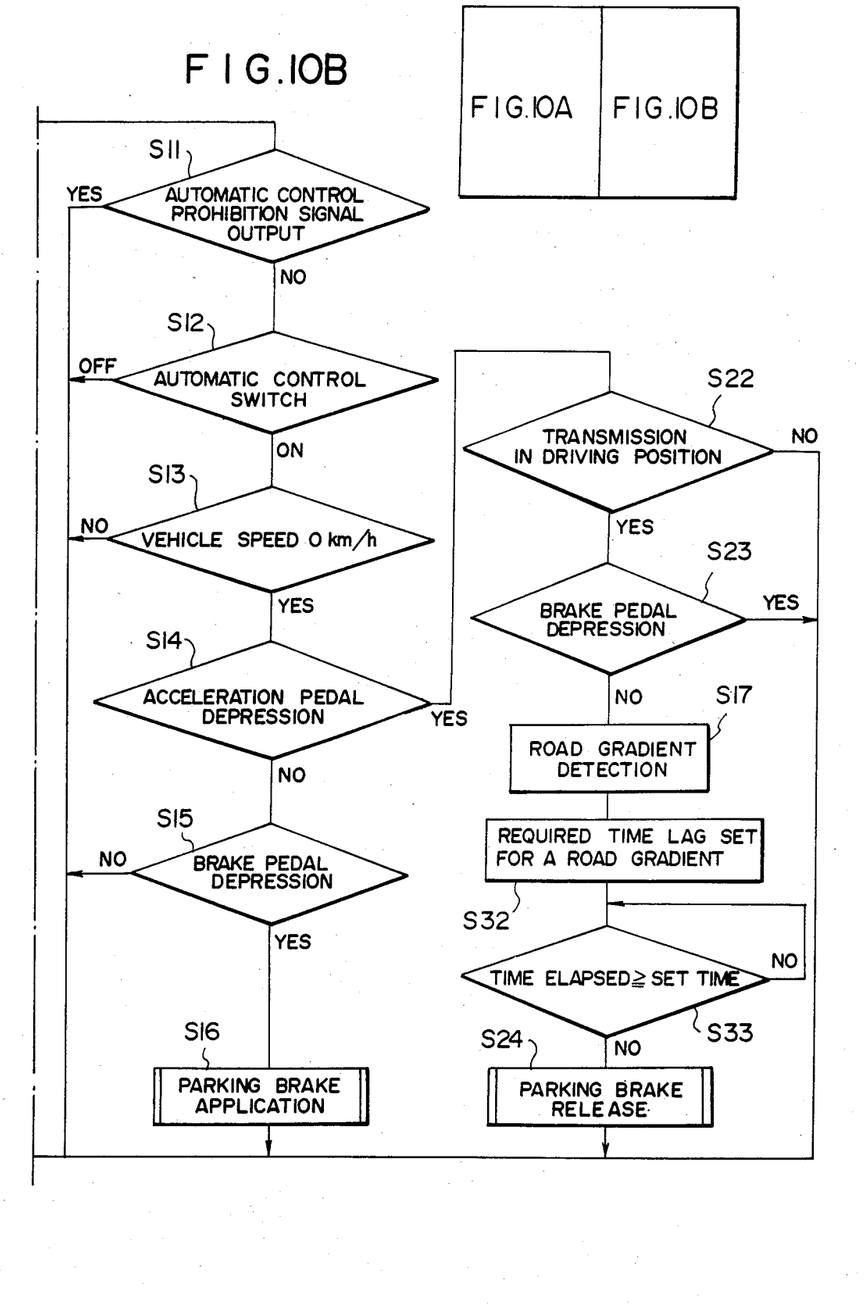
FIGS. 10A and 10B are a flow chart showing the sequential operations of the electric parking brake system under the action of the control section of FIG. 9.
Figure 10A:
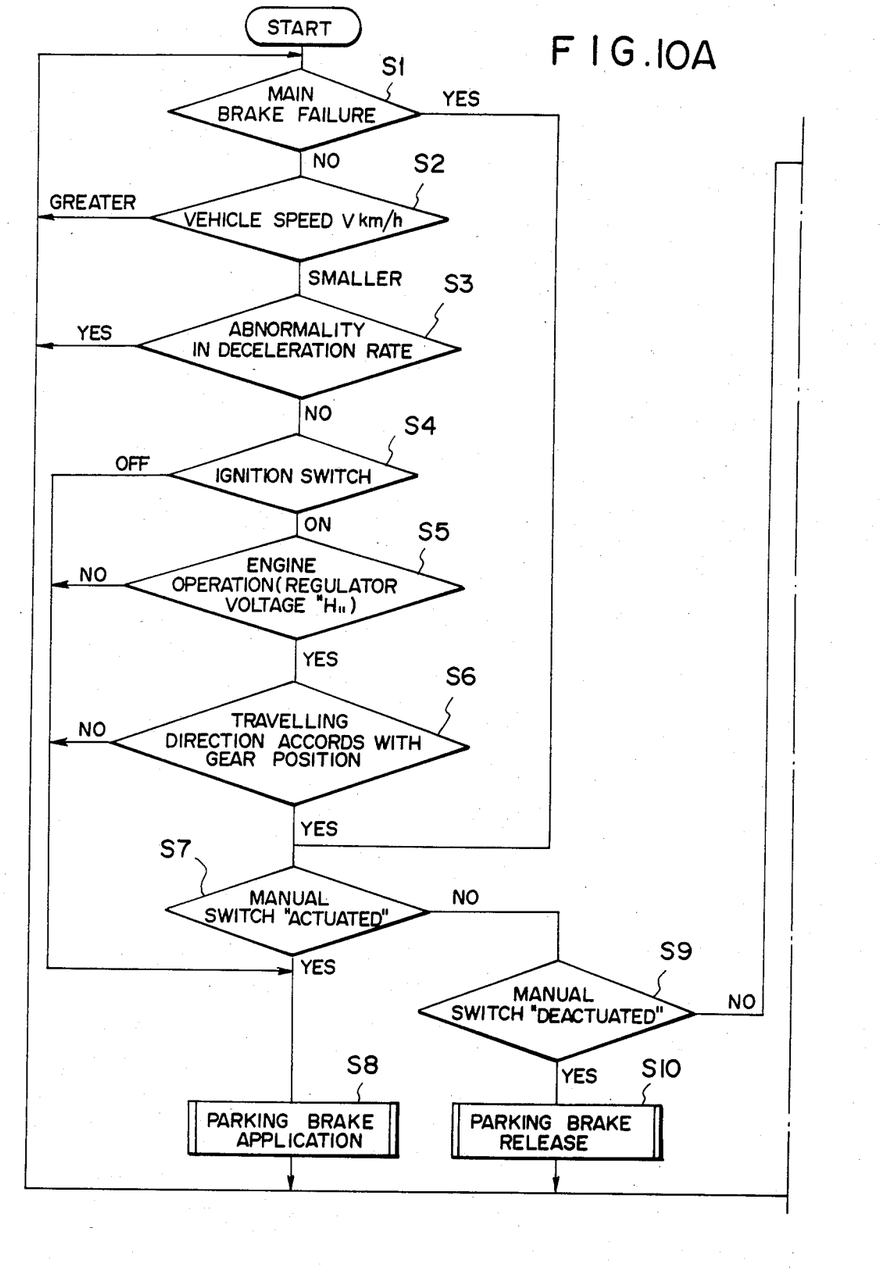
Figure 11:
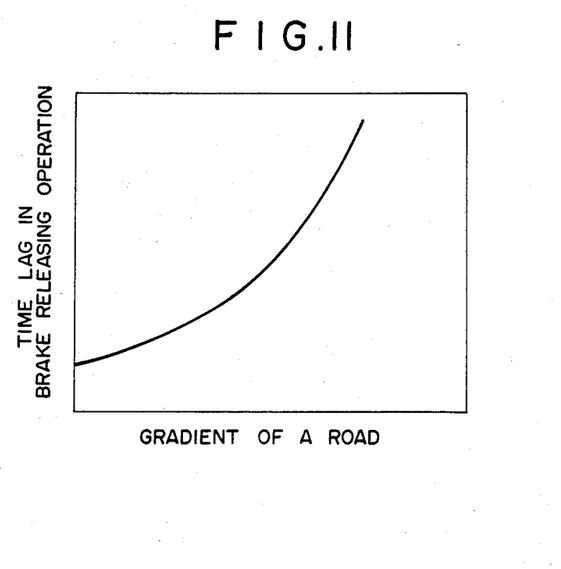
FIG. 11 shows a characteristic set in a controller of FIG. 9, illustrating the relationship between the time lag in the brake-releasing operation and the gradient of the road.
Figure 12:
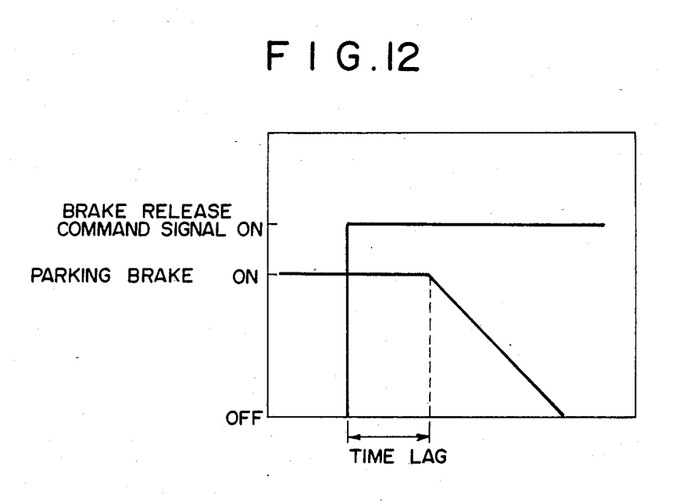
FIG. 12, is an explanatory view illustrating the time lag between the time when a brake-releasing command signal is issued and the time when the brake-releasing operation begins.

FIGS. 9 to 12 show another embodiment of the present invention which is different from the above-described first embodiment shown in FIGS. 1 to 8 only in the features that the engine-speed sensor 20 of the first embodiment is omitted; the motor-speed adjuster 24 of the first embodiment is replaced by a time-lag adjuster 25; and the controller 11 in this embodiment is designed to have a delayed brake-releasing characteristic in which the time lag occurring upon release of the parking brake is increased in accordance with the increasing gradient of the road, as illustrated in FIG. 11. In this respect, the time lag is defined as the period of time from the time at which the brake-releasing command signal B is issued to the time at which the motor 6 starts the brake-releasing operation, as shown in FIG. 12. By experiment it was found that some desirable values of the time lag with respect to road gradient are as shown in Table II below.

TABLE II

| Gradient (%) | Time lag (second) |
| --- | --- |
| 0 | 0.2 |
| 10 | 0.4 |
| 20 | 0.6 |
| 30 | 1.5 |

Now, description will be made of the operation of this embodiment with reference to FIG. 10.

In accordance with steps S1 to S6 shown in FIG. 10A, the controller 11 first confirms the operating condition of the vehicle based on the signals C–G from the brake-fluid level sensor 12, the vehicle-speed sensor 13, the ignition switch 14, the regulator-voltage sensor 15 and the position sensor 16. In this case, suppose that it is confirmed that there is no failure in the main brake system and that the requirements for controlling the parking brake system are satisfied, that is, the vehicle speed is lower than a preset level V; the rate of deceleration is normal; the ignition switch is held "ON": the engine is in operation; and the direction of travel (the forward or backward travel) of the vehicle is in accord with the selected gear position of the transmission. Then, the parking brake is controlled by the manual switch 22 in accordance with steps S7 to S10. Specifically, when the manual switch 22 is put into the operative position, it outputs a brake-application command signal A' to the motor 6 whereas a brake-releasing command signal B' is fed from the manual switch 22 to the motor 6 when the switch 22 is brought into the inoperative or release position. As a result, the parking brake is applied or released by the manual switching operation of the switch 22. In this case, if the signal C from the brake-fluid level sensor 12 shows a failure in the main brake system, it is possible to control the parking brake by virtue of the manual switch 22 in accordance with steps S1 and S7 to S10 irrespective of whether or not the requirements for controlling the parking brake are fulfilled. On the other hand, in a case where the main brake system is normal in operation, no control over the parking brake is effected as in steps S2 and S3 when the speed of the vehicle is greater than the preset value V or when the rate of deceleration is abnormal. But, the parking brake is actuated as in steps S4, S5, S6 and S8 without regard to the position of the manual switch 22 in cases where the ignition switch is held "OFF", the engine is out of operation, or the traveling direction of the vehicle is not in accord with the selected gear position of the transmission.

On the other hand, when the manual switch 22 is not in the operative position or in the inoperative position, the parking brake is automatically controlled in the following manner in accordance with steps S11 to S16 and steps S22, S23, S17, S32, S33 and S24. First, the controller 11 confirms that there is no automatic-control prohibition signal which is issued in a case where automatic control of the parking brake is not desirable on the basis of the traveling condition of the automotive vehicle, and that a switch for switching the control mode of the parking brake is thrown into the position of automatic control mode, and further confirms whether the parking-brake operation requirements are satisfied or not on the basis of the signals D, H and I respectively from the vehicle-speed sensor 13, the acceleration sensor 17 and the main brake sensor 18. Thereafter, if it is confirmed that the above requirements are satisfied (that is, the vehicle speed is zero; the accelerator pedal is not depressed; and the brake pedal is depressed), the controller 11 feeds a brake-application command signal A to the motor 6 so that the motor 6 is driven to rotate in the brake-applying direction to actuate the parking brake until the motor-stopping time sensor 23 issues a signal K.

Subsequently, when the accelerator pedal is depressed upon starting of the vehicle after the parking brake has been actuated in the this manner, a signal H from the acceleration sensor 17, indicative of the depression of the accelerator pedal, is fed to the controller 11 so that the controller 11 can confirm the requirement for releasing the parking brake in accordance with steps S14, S22 and S23, as shown in FIG. 10. In this case, at the instant when these requirements are fulfilled (that is, when the signal G from the position sensor 16 indicates the transmission to be in the driving position and the signal I from the main brake sensor 18 indicates the brake pedal to be in a released position with the accelerator pedal depressed), the controller 11 sends out a brake-releasing command signal B to the motor 6.

In this case, the parking brake is released in the following manner. From the signal J from the gradient sensor 19, the controller 11 detects the gradient of the road in step S17 and sets a time lag suitable for the detected gradient in accordance with the characteristic curve, as shown in FIG. 11, in step S32. Then, the time-lag adjuster 24 measures the time elapsed from the issuance of the brake-releasing command signal B and compares the elapsed time with the set period of the time lag so that, when the set period of time is up, the motor 6 is started to rotate in the brake-releasing direction as in steps S33 and S24. In this manner, the time at which the parking brake begins to be released can be controlled in an appropriate manner in accordance with the gradient of the road. Thus, for example, when the vehicle is started on a steep ascending slope, there will be no trouble such as backward travel of the vehicle which would otherwise result from too early release of the parking brake.

In summary, the present invention provides an improved electric parking brake system for a vehicle in which the brake-applying and releasing operations can be effected in an optimal manner in accordance with the gradient of the road, on which the vehicle rests, whereby insufficiency of the braking force of the parking brake when the vehicle is stopped on a slope and premature release of the parking brake upon starting of the vehicle on an ascending road can be effectively eliminated, thus ensuring excellent operation of the parking brake at all times.

In this connection, it is to be noted that the present invention includes the case in which either one of the brake-applying operation and the brake-releasing operation of the parking brake is controlled in accordance with the road gradient. Also, means for actuating the parking brake is not limited to a motor as employed in the above embodiments but may be other electromagnetic means such as an electromagnetic value which is connected with the brake cable and disposed in a fluid passage for feeding pressure fluid to a fluid actuator for the wheel brakes.

We claim:

1. An electric parking brake system for a vehicle comprising in combination:
   a parking brake installed on a vehicle;
   an electromagnetic means for controlling application and release of said parking brake;

a gradient sensor adapted to detect the gradient of the road on which the vehicle rests for sending out a signal indicative of the gradient detected;

a condition sensor adapted to detect the operating condition of the vehicle; and a controller adapted to receive the signals from said condition sensor and said gradient sensor and to alternatively feed a brake-application command signal and a brake-release command to said electromagnetic means in accordance with the operating condition of the vehicle, at least one of the brake-applying operation and the brake-releasing operation of said electromagnetic means being variably controlled by said controller in accordance with the signal from said gradient sensor.

2. An electric parking brake system for a vehicle as defined in claim 1, further comprising means for decreasing the brake-releasing speed of said electromagnetic means in accordance with increasing road gradient.

3. An electric parking brake system for a vehicle as defined in claim 2, further comprising an operating member movable to actuate or de-actuate said parking brake, and wherein said electromagnetic means comprises a motor operatively connected with said operating member for imparting a stroking movement to the latter, said controller being operable to control the power supply to said motor so as to change the speed of rotation thereof.

4. An electric parking brake system for a vehicle as defined in claim 1, further comprising an engine sensor adapted to detect the operating conditions of the engine for driving the vehicle, said command-signal producing means being operatively connected with said engine sensor and being operable to change the point in time at which a brake-release command signal is produced in a manner such that the brake-releasing operation of said electromagnetic means begins when the output power of said engine reaches a higher value with increasing gradient of the road.

5. An electric parking brake system for a vehicle as defined in claim 1, wherein said controller is operated to increase the brake-applying force of said electromagnetic means in accordance with increasing gradient of the road.

6. An electric parking brake system for a vehicle as defined in claim 1, wherein said condition sensor comprises:

a speed sensor for detecting whether or not the speed of the vehicle is greater than a preset level;

a main brake sensor for detecting whether a main brake is in or out of operation;

an acceleration sensor for detecting whether an accelerator pedal is depressed or not; and a position sensor for detecting whether or not a transmission is in a driving position;

said controller being adapted to receive signals from each of said speed sensor, said main brake sensor, said acceleration sensor and said position sensor and operable to send out a brake-application command signal to said electromagnetic means in cases where the signals from said speed sensor, main brake sensor and acceleration sensor are received to indicate that the vehicle speed is less than said preset level, said main brake is in operation and said accelerator pedal is not depressed whereas said command-signal producing means sends out a brake-release command signal to said electromagnetic means in cases where the signals from said main brake sensor, acceleration sensor and position sensor are received to indicate that said main brake is released, said accelerator pedal is depressed and the transmission is in the driving position.

7. An electric parking brake system for a vehicle as defined in claim 6, wherein said controller is operated to increase the brake-applying force of said electromagnetic means in accordance with increasing gradient of the road.

8. An electric parking brake system for a vehicle as defined in claim 1, further comprising a switch means adapted to generate manual signals for brake-application and brake-release by manual operation, wherein said controller alternatively produces a brake-application command signal and a brake-release command signal on the basis of the output signal from said condition sensor and the operating position of said switch means.

9. An electric parking brake system for a vehicle as defined in claim 8, wherein said controller is operated to increase the brake-applying force of said electromagnetic means in accordance with increasing gradient of the road.

10. An electric parking brake system for a vehicle as defined in claim 6, further comprising means for decreasing the brake-releasing speed of said electromagnetic means in accordance with increasing road gradient.

11. An electric parking brake system for a vehicle as defined in claim 10, further comprising an operating member movable to actuate or de-actuate said parking brake, and wherein said electromagnetic means comprises a motor operatively connected with said operating member for imparting a stroking movement to the latter, said controller being operable to control the power supply to said motor so as to change the speed of rotation thereof.

12. An electric parking brake system for a vehicle as defined in claim 6, further comprising an engine sensor adapted to detect the operating conditions of the engine for driving the vehicle, said command-signal producing means being operatively connected with said engine sensor and operable to change the point in time at which a brake-release command signal is produced in a manner such that the brake-releasing operation of said electromagnetic means begins when the output power of said engine reaches a higher value with increasing gradient of the road.

13. An electric parking brake system for a vehicle as defined in claim 8, further comprising means for decreasing the brake-releasing speed of said electromagnetic means in accordance with increasing gradient of the road.

14. An electric parking brake system for a vehicle as defined in claim 13, further comprising an operating member movable to actuate or de-actuate said parking brake, and wherein said electromagnetic means comprises a motor operatively connected with said operating member for imparting a stroking movement to the latter, said controller being operable to control the power supply to said motor so as to change the speed of rotation thereof.

15. An electric parking brake system for a vehicle as defined in claim 8, further comprising an engine sensor adapted to detect the operating conditions of the engine for driving the vehicle, said command-signal producing means being operatively connected with said engine sensor and operable to change the point in time at which a brake-release command signal is produced in a manner such that the brake-releasing operation of said electromagnetic means begins when the output power of said engine reaches a higher value with increasing gradient of the road.

16. An electric parking brake system for a vehicle comprising in combination:
a parking brake installed on a vehicle;
an electromagnetic means for controlling application and release of said parking brake;
a gradient sensor adapted to detect the gradient of the road on which the vehicle rests for sending out a signal indicative of the gradient detection
a condition sensor adapted to detect the operating condition of the vehicle;
a controller adapted to receive the signals from said condition sensor and said gradient sensor and to alternatively feed a brake-application command signal and a brake-release command to said electromagnetic means in accordance with the operating condition of the vehicle;
at least one of the brake-applying operation and the brake-releasing operation of said electromagnetic means being variably controlled by said controller in accordance with the signal from said gradient sensor; and
a time lag adjusting means operable to make greater the time lag between the time when the brake-release command signal is produced and the time when the brake-releasing operation of said electromagnetic means begins in accordance with increasing gradient of the road.

17. An electric parking brake system for a vehicle comprising in combination:
a parking brake installed on a vehicle;
an electromagnetic means for controlling application and release of said parking brake;
a gradient sensor adapted to detect the gradient of the road on which the vehicle rests for sending out a signal indicative of the gradient detected;
a condition sensor adapted to detect the operating condition of the vehicle;
a controller adapted to receive the signals from said condition sensor and said gradient sensor and to alternatively feed a brake-application command signal and a brake-release command to said electromagnetic means in accordance with the operating condition of the vehicle;
at least one other brake-applying operation and the brake-releasing operation of said electromagnetic means being variably controlled by said controller in accordance with the signal from said gradient sensor;
said condition sensor comprising a speed sensor for detecting whether or not the speed of the vehicle is greater than a preset level;
a main brake snesor for detecting whether a main brake is in or out of operation;
an acceleration sensor for detecting whether an accelerator pedal is depressed or not;
a position sensor for detecting whether or not a transmission is in a driving position, said controller being adapted to receive signals from each of said speed sensor, said main brake sensor, said acceleration sensor, and said position sensor and operable to send out a brake-application command signal to said electromagnetic means in cases where the signals of said speed sensor, main brake sensor, and acceleration sensor are received to indicate that the vehicle speed is less than said preset level, said main brake is in operation and said accelerator pedal is not depressed whereas said command-signal producing means sends out a brake-release command signal to said electromagnetic means in cases where the signals from said main brake sensor, acceleration sensor, and position sensor are received to indicate that said main brake is released, said accelerator pedal is depressed and the transmission is in the driving position, and a time-lag adjusting means operable to make greater the time lag between the time when the brake-release command signal is produced and the time when the brake-releasing operation of said electromagnetic means begins in accordance with increasing gradient of the road.

18. An electric parking brake system for a vehicle comprising in combination:
a parking brake installed on a vehicle;
an electromagnetic means for controlling application and release of said parking brake;
a gradient sensor adapted to detect the gradient of the road on which the vehicle rests for sending out a signal indicative of the gradient detected;
a condition sensor adapted to detect the operating condition of the vehicle;
a controller adapted to receive the signals from said condition sensor and said gradient sensor and to alternatively feed a brake application command signal and a brake release command to said electromagnetic means in accordance with the operating condition of the vehicle;
at least one of the brake-applying operation and the brake-releasing operation of said electromagnetic means being variably controlled by said controller in accordance with the signal from said gradient sensor;
a switch means adapted to generate manual signals for brake-application and brake-release by manual operation, wherein said controller alternatively produces a brake-application command signal and a brake-release command signal on the basis of the output signal from said condition sensor and the operating position of said switch means; and
a time-lag adjusting means operable to make greater the time lag between the time when the brake-release command signal is produced and the time when the brake-releasing operation of said electromagnetic means begins in accordance with increasing gradient of the road.

* * * * *